(12) United States Patent
Klonowski, III

(10) Patent No.: US 7,299,554 B2
(45) Date of Patent: Nov. 27, 2007

(54) HINGE BASE PLATE MOUNTING TOOL FOR FACE FRAME HINGES

(76) Inventor: Stanley B. Klonowski, III, 450 N. May St., #3113, Mesa, AZ (US) 85201

( * ) Notice: Subject to any disclaimer, the term of this patent is extended or adjusted under 35 U.S.C. 154(b) by 0 days.

(21) Appl. No.: 11/180,026

(22) Filed: Jul. 11, 2005

(65) Prior Publication Data

US 2005/0278962 A1    Dec. 22, 2005

Related U.S. Application Data

(63) Continuation-in-part of application No. 10/945,819, filed on Sep. 20, 2004, now Pat. No. 6,959,498.

(60) Provisional application No. 60/580,884, filed on Jun. 18, 2004.

(51) Int. Cl.
 *E04F 21/00* (2006.01)
(52) U.S. Cl. .............................. 33/194; 33/197; 33/613; 52/800.13
(58) Field of Classification Search .................. 33/194, 33/197, 667, 201, 562–567.1, 613, 645, DIG. 10, 33/370–372; D10/64; 248/222.12, 316.7, 248/300, 200; 52/800.12, 800.13, DIG. 1
See application file for complete search history.

(56) References Cited

U.S. PATENT DOCUMENTS

| 1,101,516 | A | * | 6/1914 | Ahlvin ........................ 33/197 |
| 1,224,302 | A |  | 5/1917 | Johnson |
| 1,577,943 | A | * | 3/1926 | Woodley ...................... 33/197 |
| 1,611,930 | A | * | 12/1926 | MacLeod ..................... 33/197 |
| 1,680,575 | A | * | 8/1928 | Starbuck ...................... 33/197 |
| 1,849,961 | A | * | 3/1932 | Snelling ....................... 33/197 |
| 2,570,430 | A | * | 10/1951 | Cramer ........................ 33/342 |
| 2,634,507 | A |  | 4/1953 | Boatwright |
| 2,675,626 | A |  | 4/1954 | Boatwright |
| 2,965,972 | A | * | 12/1960 | Hunt ............................ 33/197 |
| 2,990,172 | A | * | 6/1961 | Mario ........................... 269/50 |
| 3,089,211 | A | * | 5/1963 | Perusse ........................ 24/556 |

(Continued)

FOREIGN PATENT DOCUMENTS

GB        2219763 A  *  12/1989

(Continued)

*Primary Examiner*—G. Bradley Bennett
*Assistant Examiner*—Tania C Courson
(74) *Attorney, Agent, or Firm*—Schmeiser, Olsen & Watts LLP

(57) ABSTRACT

A jig for face frame hinges may include a base and gripping members, wherein the jig may be secured to a frame member or a wall adapted to receive a hinge base plate and the hinge base plate may be abutted with a first hinge abutting edge of the jig. The gripping members may hold the jig in a selected position so that the hinge base may be abutted with the jig while fasteners are engaged through the base and into the frame member, or while holes are pre-drilled and fasteners engaged to mount the hinge base. The proper position may typically be with a second frame member abutting edge of the jig abutted with an adjacent adjoining frame member. Thus, the jig edges form stops for consistently and positively locating hinge bases of a face frame hinge at a predetermined distance from adjacent frame members.

18 Claims, 3 Drawing Sheets

U.S. PATENT DOCUMENTS

| | | | | |
|---|---|---|---|---|
| 3,104,473 | A | * | 9/1963 | Rose .......................... 33/501 |
| 3,184,859 | A | | 5/1965 | Patrick |
| 3,271,919 | A | * | 9/1966 | Olton ..................... 52/800.13 |
| 3,648,334 | A | * | 3/1972 | Swalm ........................ 24/561 |
| 4,335,864 | A | * | 6/1982 | Merlini ................... 248/316.7 |
| 4,400,886 | A | | 8/1983 | Bindschatel |
| 4,686,769 | A | | 8/1987 | Rock et al. |
| 4,739,561 | A | * | 4/1988 | Mills .......................... 33/370 |
| 4,873,769 | A | | 10/1989 | Casanave |
| 4,914,822 | A | * | 4/1990 | Wetherington ............... 33/197 |
| 5,042,543 | A | | 8/1991 | Carey |
| 5,064,319 | A | | 11/1991 | Ericksen |
| 5,114,285 | A | * | 5/1992 | Brydon ................... 408/115 R |
| 5,129,153 | A | * | 7/1992 | Burns, Sr. ..................... 33/613 |
| 5,351,460 | A | * | 10/1994 | Small ........................ 52/741.1 |
| 5,671,538 | A | * | 9/1997 | Lautenschlager ............ 33/194 |
| D395,246 | S | | 6/1998 | Carey |
| 5,762,115 | A | | 6/1998 | Shouse |
| 5,781,966 | A | | 7/1998 | Ferrari et al. |
| 5,964,010 | A | | 10/1999 | Huber |
| 6,145,164 | A | | 11/2000 | Ferrari et al. |
| 6,468,007 | B2 | | 10/2002 | Coleiro |
| 6,550,153 | B1 | * | 4/2003 | Keith .......................... 33/562 |
| 6,560,820 | B2 | | 5/2003 | Heisig et al. |
| 6,694,568 | B2 | | 2/2004 | Baer |
| 6,732,409 | B2 | | 5/2004 | Baer |
| 6,807,777 | B2 | * | 10/2004 | Wagner et al. ............. 52/204.1 |
| 7,003,889 | B1 | * | 2/2006 | Luciani ....................... 33/194 |
| 2001/0020317 | A1 | | 9/2001 | Heisig et al. |
| 2003/0000091 | A1 | | 1/2003 | Havenstein et al. |
| 2004/0031204 | A1 | | 2/2004 | Thompson |

FOREIGN PATENT DOCUMENTS

GB          2229391 A  *  9/1990

* cited by examiner

HINGE BASE PLATE MOUNTING TOOL FOR FACE FRAME HINGES

CROSS REFERENCE TO RELATED APPLICATION

This application is a continuation-in-part of the earlier U.S. Utility Patent Application to Stanley B. Klonowski, III entitled "HINGE BASE PLATE MOUNTING TOOL," Ser. No. 10/945,819, filed Sep. 20, 2004, now U.S. Pat. No. 6,959,498, which claims priority to U.S. Provisional Patent Application to Stanley B. Klonowski, III entitled "HINGE BASE PLATE MOUNTING TOOL," Ser. No. 60/580,884, filed Jun. 18, 2004, the disclosures of which are hereby incorporated entirely herein by reference.

BACKGROUND OF THE INVENTION

1. Technical Field

This invention generally relates to hinge mounting tools, and more particularly to a jig providing consistent placement for face frame mounted hinges.

2. State of the Art

Several templates have been developed for marking doors and jams for placement of hinge fasteners and hinges themselves. Templates for marking locations for hinges for subsequent removal of wood to form recesses for leaves of a hinge are also known. These devices have a variety of stops including adjustable stops, many of which are provided by complex mechanisms.

Very little has been done in the area of jigs for face frame hinges. The only activity in this general area appears to have been directed to mounting of continuous hinges that have very distinct elongate structure. Conventional ways of mounting a face frame hinge are accomplished by hand measurements to determine and mark locations to pre-drill holes, and then to install the face frame hinge base. An artisan may use a tape measure or other measuring device to attempt to correctly mark the location for the hinge. The consistency of placement of the hinge is then left to the artisan's accuracy and is often subject to human error in measuring and/or predrilling.

Furthermore, the conventional manner of mounting hinges and mounting the associated doors on cabinets requires correlating the position of the hinge base on the door to the position of the hinge base on the cabinet. Thus, additional potential for errors is introduced during the steps of correlating the measurement on the cabinet to the measurement on the door, marking the position for the hinge base on the door, boring the hole in the door for the hinge base of the door mounted portion of the hinge, and predrilling and/or placing the screws when mounting the door mounted portion of the hinge. The challenge of avoiding error can be complicated by the need to add the amount of the desired overlay in order to properly position the hinge(s) on the door.

Accordingly, what is needed is a jig that provides a more consistent, accurate and convenient method of installing a face frame mounted hinge.

DISCLOSURE OF THE INVENTION

The present invention relates to a jig and a method for mounting a face frame mounted hinge. The method may include the step of mounting a hinge leaf or a hinge base plate to which the hinge may be attached. (It is to be understood that disclosure regarding hinge base plates herein may be applied to hinge leaves and vice versa, and that each of these terms may be more generally referred to as a hinge base.) The jig may include a base and gripping members configured such that the jig may be secured to a frame member or wall on which the hinge is to be mounted by engaging the gripping members in straddling relation on the frame member or wall. The jig may have predetermined dimension from one end edge to an opposite end edge. As such, abutting a first of the end edges with an adjoining adjacent frame member or wall positively positions a second of the end edges at a position spaced a predetermined distance from the adjoining wall. Once the jig is secured to the wall in the correct position, the hinge base plate may be abutted with the base of the jig. With the base plate abutted with the base of jig, the base plate is held in proper position to mount the base plate at the predetermined distance. Holes can be pre-drilled through screw receiving holes in the base plate while it abuts with the jig base and is held in the proper position. Then the base plate may be secured by screws or the like, and the jig may be pulled away from the wall leaving the base plate exactly in the proper position on the cabinet. In some cases, the step of pre-drilling may be omitted. In any case, the process of securing the jig to the frame member, abutting the base plate to the jig, securing the base plate to the cabinet and removing the jig from the frame member or wall of the cabinet may be repeated indefinitely so that base plates can be continuously and accurately mounted. The steps for mounting base plates and their respective hinges are thus simplified and the speed with which base plates may be mounted is increased dramatically. No preparation including measuring is required. A user may simply abut the base plate to the jig and mount it.

In particular embodiments, the present invention may include a jig kit for mounting a hinge comprising a jig, the jig comprising a base and at least two plate gripping members connected to the base and extending in a first direction away from the base. The base and gripping member may comprise a holding mechanism, the holding mechanism having a quiescent state and a gripping state. In one configuration, the gripping members may have respective gripping segments spaced with a minimum separation in the quiescent state in a range from ½ to 1 inch from each other. In another configuration, the gripping members are expandible so that the gripping segments are spaced at least ½ inch from each other in the gripping state.

In another particular embodiment of the present invention a method of mounting a hinge may comprise selecting a jig having a particular jig length. The method may include, consistently positioning a hinge base on a frame member or wall of the cabinet at a predetermined distance spaced from an adjacent frame member or wall by removeably securing the jig in a position of use, retaining the jig in the position of use by a gripping mechanism that is integral with the jig and abutting a hinge base with an edge of the jig during the step of retaining.

Further still, in another particular embodiment of the present invention, a method of mounting a hinge base may comprise placing a jig on a frame member or wall adapted to receive the hinge base. The method may include abutting the hinge base with at least one edge of the jig. The method may also include, attaching the hinge base to the frame member or wall of the cabinet while the jig remains in place on the frame member or wall.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a jig for mounting a hinge. Particular embodiments of the present invention may comprise a jig having a base and gripping members. The jig may be secured to a frame member or wall adapted to receiving a hinge base plate. In particular, one end edge of the jig may be abutted against an adjacent adjoining frame member or wall so that an opposite end edge positively establishes a stop for a hinge base plate or hinge leaf. The hinge base plate or leaf may then be abutted with the opposite end edge of the base of the jig.

Figure 1:
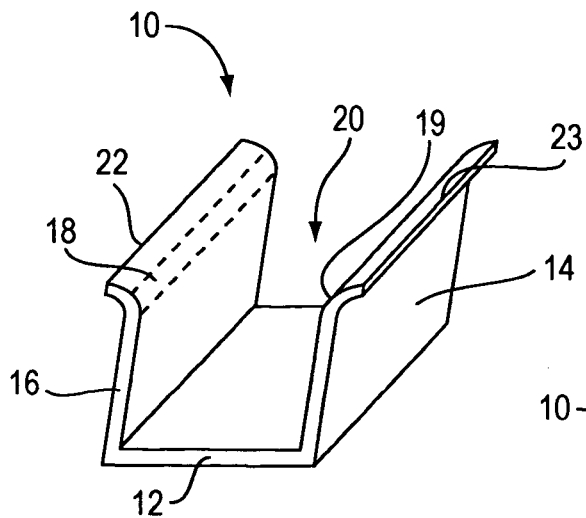
FIG. 1 is a perspective view of a jig according to an embodiment of the present invention.

In FIG. 1, a particular embodiment of a jig 10 is shown. The jig 10 may comprise a base 12, opposing gripping members 14 and 16, gripping segments 18 and 19 of the gripping members 14 and 16, gripping member ends 22 and 23, and a channel 20 between the gripping members 14 and 16. The gripping members 14 and 16 are connected to the base 12 and extend in a direction away from the base 12. The base 12 and the gripping members 14 and 16 may comprise a holding mechanism for holding the jig in place when in use on a frame member or wall adapted to receive a hinge. The holding mechanism may include resiliency of a material of the jig 10. The separation in the channel 20 may be varied during use and is defined by the space between the gripping members 14 and 16. The holding mechanism may have a quiescent state and a gripping state, in which the gripping members are urged outward against a bias of the jig. Thus, the separation of the gripping members 14 and 16 in the channel 20 may be greater in the gripping state than in the quiescent state. For the exemplary purposes of this disclosure, the minimum separation in channel 20 in the quiescent state may be in a range from one eighth inch to one and one half inches and the minimum separation of the gripping members 14 and 16 forming channel 20 in the gripping state may be greater than that of the separation in the quiescent state. Alternatively, the minimum separation of the gripping members in the quiescent state may be from 11/16 to 15/16. In another configuration, the jig may have a minimum separation in the gripping state of at least ½ inch. Further alternatively, the jig may be secured to a frame member or wall by a wedging action so that the gripping members are forced away from each other and the wall engages the gripping members at a position deeper into the channel and progressively nearer the base of the jig as the jig is forced further onto the frame member.

Figure 2:
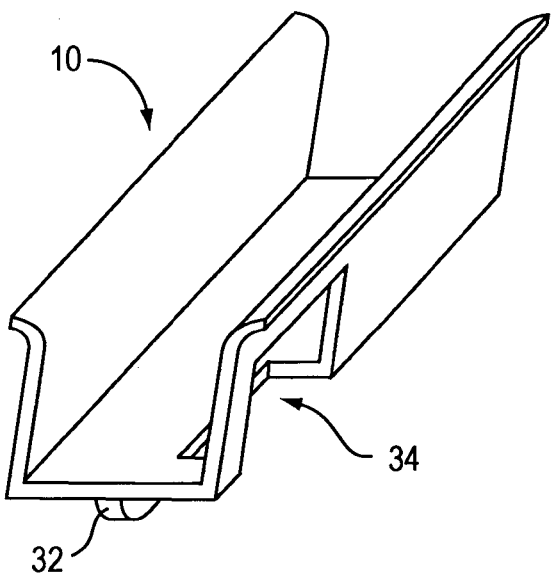
FIG. 2 is a perspective view of a jig with a user grip handle configured according to an embodiment of the present invention.

Referring to FIG. 2, other particular embodiments of a jig 10 may also comprise a finger grip handle 32. The finger grip may include an slip-resistant surface to provide a user with greater ability to grip the jig 10 for securing and removing the jig 10 when in use to mount a hinge. The handle 32 may be used to remove the jig 10 from its secured position upon completion of mounting a hinge, particularly when the jig 10 is firmly secured and difficult to remove. While it has been shown that a jig 10 may comprise finger grip handle 32, the jig 10 may additionally or alternatively comprise finger grips in other locations including outer surfaces of the gripping members whether the surfaces are closed as shown in FIG. 1 or have one or more openings as exemplified by opening 34 in FIG. 2. The purpose of the opening 34 may be to receive and positively locate a hinge base plate or hinge leaf on a cabinet face frame or wall similar to the embodiments shown and described in my parent application entitled "HINGE BASE PLATE MOUNTING TOOL," Ser. No. 10/945,819, and my Provisional Patent Application of the same title having Ser. No. 60/580,884, the disclosures of which are hereby incorporated entirely herein by reference. It is to be noted that the jig 10 may have a length similar to the length of the jig shown in FIG. 1, or alternatively, may be longer to accommodate the opening 34 and still provide a hinge center at approximately the same distance from an adjacent frame member as the embodiment of FIG. 1.

Figure 3:
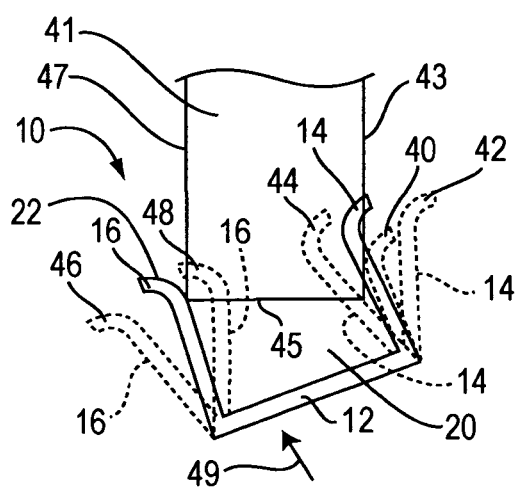
FIG. 3 is an end view of the jig of FIG. 1 with alternative configurations of gripping members according to particular embodiments of the present invention.

The gripping members of FIGS. 1 and 2 may have various different configurations according to particular embodiments of the present invention, as shown in FIG. 3. Gripping member 14 may be shorter in length than gripping member 16 as shown by gripping member 40. Gripping member 14 may also have a position 42 in its quiescent state. As shown, the gripping member 14 in a position 42 extends in a direction outward and away from the base 12 at an obtuse angle with respect to the base 12. Alternatively, the gripping member 14 may have a position 44 in a quiescent state in which the gripping member 14 extends in a direction inwardly and away from the base 12 at an acute angle with respect to the base 12.

Similarly, gripping member 16 may also have a position 46 in a quiescent state that extends in a direction outward and away from the base 12 at an obtuse angle with respect to the base 12. Gripping member 16 may alternatively have a position 48 in which the gripping member 48 extends in a direction inward and away from the base 12 at an acute angle with respect to the base 12.

These various configurations of each of the gripping members 14 and 16 relative to the base 12 define the shape of the channel 20. For example and without limitation, a jig comprising gripping members 14 and 16 may result in a channel configuration formed by gripping members 14 and 16 positioned at 42 and 46 respectively having a wedge configuration. A jig with gripping members positioned at 44 and 48 has an inverted wedge configuration. A jig with gripping members at positions 42 and 48 or gripping members at positions 44 and 46 each would result in angled channel configurations. The shorter length gripping member 40 may be used for mounting hinges on a frame member or wall wherein there is a lesser amount of clearance for securing a jig 10 to a frame member. It will be understood by those of ordinary skill in the art that the configurations of the gripping members 14 and 16 are not limited to those shown, but rather may be of any configuration such that the jig 10 may be secured in a proper position for mounting a hinge.

Figure 4:
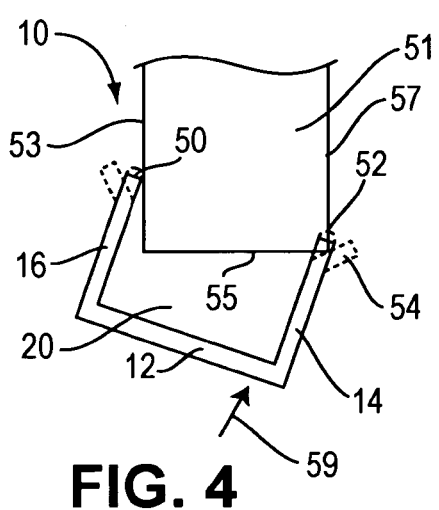
FIG. 4 is an end view of a jig with alternative gripping member ends according to embodiments of the present invention.

Referring to FIGS. 1 and 4, particular embodiments of a jig 10 may comprise opposing gripping members 14 and 16 that may comprise various types of ends. The ends may include, but are not limited to, a flat end 50, a rounded end 52, an angled flared end 54 shown in dashed lines in FIG. 4 and a rounded flared end 22 as shown in FIG. 1. The angled flared end 54 may extend outward and away from the base and the other gripping member at an angle in order to facilitate mounting of the jig 10, for example. Similarly, the rounded flared end 22 may extend outward and away from the base and the other gripping member in a rounded fashion with a radius and arc length to additionally facilitate mounting of the jig 10. It will be understood that the ends of the gripping members may include any type of end for both gripping members 14 and 16, or a combination of end types. Furthermore, it is to be understood that the flared, rounded or straight ends shown in FIGS. 1 and 4 may be applied without limitation to any of the gripping members shown and described with regard to the embodiments of FIGS. 1-3. For example, the gripping member 40 of FIG. 3 may be provided with a non-flared flat or rounded end. Any combination of lengths, angles, and end configurations is considered within the scope of the invention as long as the jig 10 functions to holdingly grip a face frame member or wall while in use, and to slide on and off the frame member or wall with relative ease between each instance of use in mounting a hinge or hinge base plate or hinge.

Referring back to FIG. 3, the jig 10 may be removably placed on a frame member or wall 41 by engaging a short gripping member 40 on a first face 43 of the frame member or wall 41. Then the jig may be moved toward the end edge 45 of the frame member or wall 41 so that a corner or intersection between the end edge 45 and a second face 47 engages with a flared end 22 of a gripping member 16. By applying a force in a direction of arrow 49, a user may advantageously cause the jig 10 to move onto the frame member or wall 41 so that gripping members 40 and 16 may straddle and grip the frame member 41 between the gripping members. It is to be noted that only one of the gripping members needs to be a gripping member and the other may be a non-gripping member. That is, one gripping member may include or support a resilient member while the other is relatively rigid and provides a blocking element or stop. Applying a force in a direction of arrow 49 may advantageously cause the jig to overcome a bias of the resilient member(s) 40, 16 and "snap" onto the frame member or wall 41. The frame member or wall 41 may thus be easily seated within the channel 20 and abut the base 12 in a position of use.

It should be noted that the flared end advantageously aids in ease of mounting the jig 10 on the frame member or wall 41. While the short gripping or member 40 is shown as having a flared end, it is to be understood that the flared end is not necessary. In fact proving the gripping member 40 with a non-flared end has the advantage of providing increased friction and holding force on the first face 43 for even greater ease of mounting the jig 10 on the frame member or wall 41. Still further, the short configuration of one of the gripping members similar to gripping member 40 has the advantage of increased ease of mounting of the jig. This is because a short gripping member 40 may act as an anchor on one side of a jig 10 when the other side has a longer gripping member similar to gripping member 16. Thus, a mechanical advantage is set up so that the jig may be rotated with a certain amount of leverage about a constructive pivot formed by the anchoring characteristic of the short gripping member 40.

Similar to the mounting of the jig described relative to FIG. 3, similar mounting structure and methodology is shown in FIG. 4. The jig 10 may be removably placed on a frame member or wall 51 by engaging a gripping member 16 on a first face 53 of the frame member or wall 51. Then the jig may be moved toward the end edge 55 of the frame member or wall 51 so that a corner or intersection between the end edge 45 and a second face 57 engages with a flared end 54 of a gripping member 14. By applying a force in a direction of arrow 59, a user may advantageously cause the jig 10 to move onto the frame member or wall 51 so that gripping members 16 and 14 may straddle and grip the frame member 51 between the gripping members. It is to be noted that only one of the gripping members needs to be a gripping member and the other may be a non-gripping member. That is, one gripping member may include or support a resilient member while the other is relatively rigid and provides a blocking element or stop. Applying a force in a direction of arrow 59 may advantageously cause the jig 10 to overcome a bias of the resilient member(s) 14, 16 and "snap" onto the frame member or wall 51. The frame member or wall 41 may thus be easily seated within the channel 20 and abut the base 12 in a position of use.

It should be noted that the flared end 54 advantageously aids in ease of mounting the jig 10 on the frame member or wall 51. While the gripping member 16 is shown as having a rounded or flat end, it is to be understood that the flat end 50 has the advantage of providing increased friction and holding force on the first face 53 for greater ease of mounting the jig 10 on the frame member or wall 51.

Figure 5:
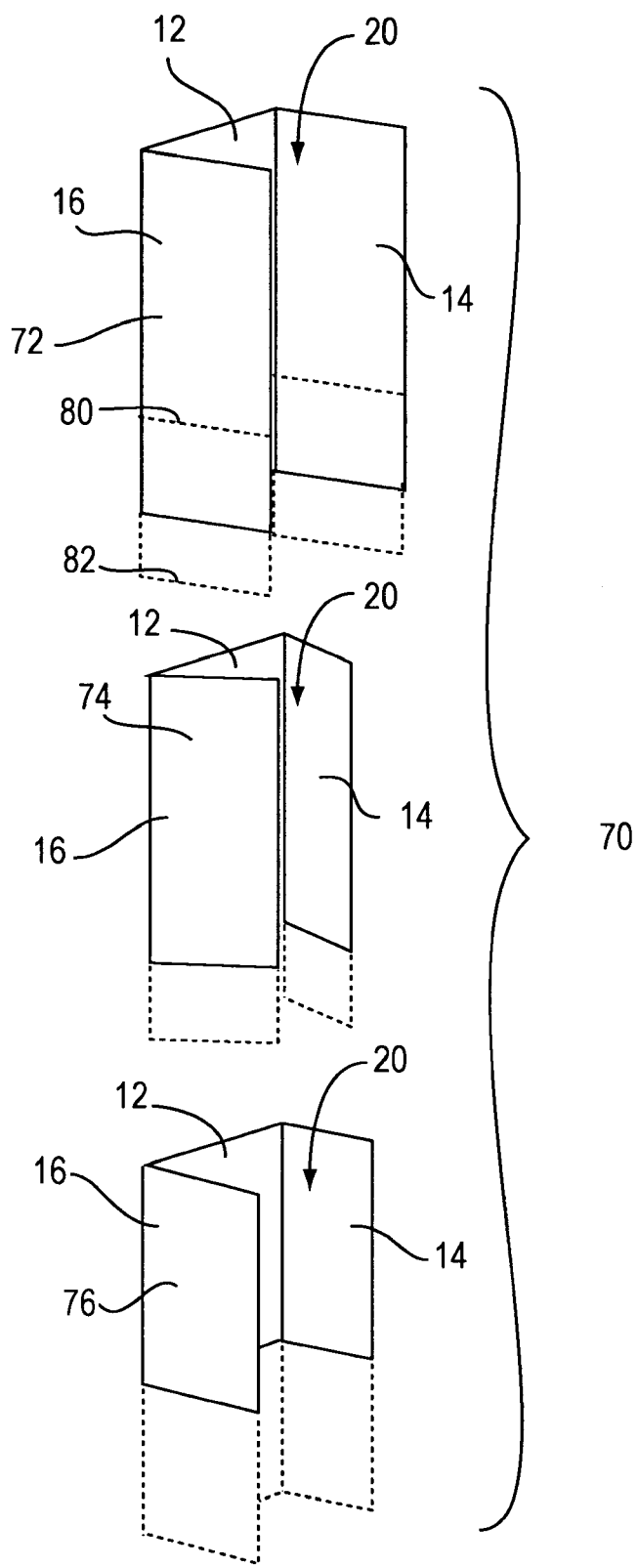
FIG. 5 is a perspective view of a jig kit according to an embodiment of the present invention.

FIG. 5 shows an exemplary schematic view of a jig kit 70 in accordance with the present invention. The jig kit 70 may comprise a set of jigs 72, 74 and 76. Jigs 72, 74 and 76 may comprise various lengths extending in a direction generally parallel to a channel 20 formed by the base 12 and gripping members. Furthermore, the kit, while shown schematically, may include any or all of the embodiments of FIGS. 1-4. The kit 70 may include jigs having various widths generally defined by the distance between the gripping members of the jigs 72, 74 and 76. The kit 70 may include jigs having various gripping member configurations. For example, but without limitation, jig 72 may be have gripping members in a generally rectangular channel configuration, jig 74 may have gripping members in an inverted wedge configuration and jig 76 may have channels in a wedge configuration. The various lengths may be, for example, a length 80 shorter that the length of jig 72 or length 82 longer than the length of jig 72. It is to be understood that kits may include sets of any number of jigs in any combination of configurations, including a set of one jig.

Kits having jigs with predetermined lengths for positioning hinge base plates or hinge leaves at a few predetermined respective standard distances from an adjacent frame member or adjacent cabinet wall may be particularly advantageous. In this way, an artisan may select a jig from his or her set in accordance with the size of a door to be mounted. For example with short doors on cabinets that typically are located above a refrigerator, a three inch center offset from an adjacent frame member will likely be too far from an end edge of the door. Thus, a variety of lengths will be advantageous for selectively mounting doors of different sizes. For example, the jigs may be of lengths from two to four inches long. Alternatively, the lengths of the jigs may be from one and one half inch to five inches long. Further alternatively, the length of the jigs may be from one half inch to eight inches, or any value within this range. In particular, longer jigs may be provided with openings similar to opening 34 in FIG. 2, for receiving a hinge base plate of hinge leaf in accordance with the disclosure of the parent application referenced above. It is to be understood that openings for this purpose may be located in one or more of the gripping members 14, 16 or base 12.

For most doors, a three inch center offset from an adjacent frame member of a face frame is a good standard. In order to achieve such a standard center, the jig 10 must be of a length equal to three inches minus half the overall height of the hinge base plate or hinge leaf. Thus, the set of jigs 70 may be provided with lengths which will provide a targeted three inch center when used to mount a particularly popular hinge base plate, for example. In one case, the jig may be one and thirteen sixteenths of an inch long in order to advantageously provide a three inch center when used with a particular hinge base. This is very advantageous because it resolves a myriad of opportunities for human error in the process of measuring, marking, boring, and/or mounting the hinges to the corresponding doors that are to be mounted. That is, with a set standard center established by a particular jig length and a particular hinge base plate height, the machine for boring the doors can be set for the same standard center, (with any appropriate overlay), so that all of the hinges will be mounted on the doors in exact alignment with all the hinge base plates that are to be mounted on the cabinets with the particular jig. Thus, the present invention has the advantage of insuring to proper positioning of the hinges on the doors relative to the corresponding base plates on the cabinets.

Kits in accordance with the present invention may have jigs with a variety of channel widths defined between gripping members in either their quiescent or gripping states that generally correspond to standard thicknesses of face frame or cabinet walls will also be advantageous. However, while standard separation between gripping members may include distances such as, but not limited to, ½, ¹¹⁄₁₆, ¾, ¹³⁄₁₆, ⅞ and 1 inches, it will be understood that the separation corresponding to the thickness of face frame walls may include, without limitation, any value in a range of separations from ¼ to 1 and ½ inch. Furthermore, it is to be understood that the teachings of this invention may be equally applied to cabinets without face frames since the jig 10 may slide onto a front edge of a frameless opening of a cabinet, for example.

Figure 6A:
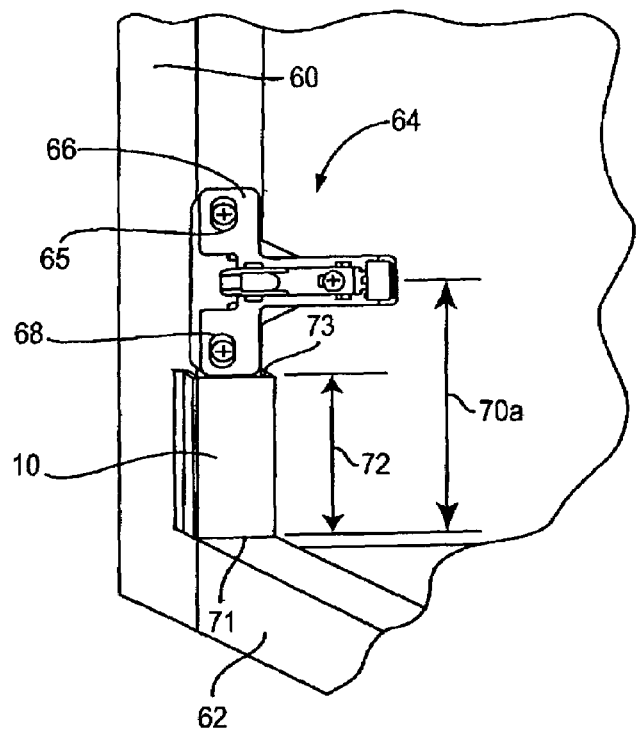
FIG. 6A is a perspective view of a jig in use for mounting a hinge according to an embodiment of the present invention.
Figure 6B:
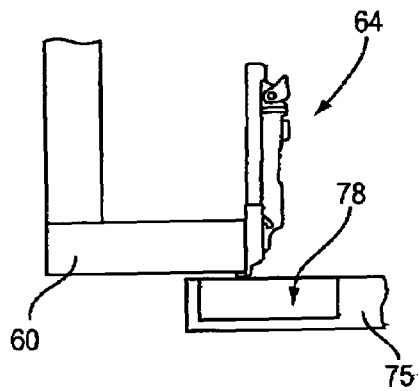
FIG. 6B is a schematic sectional view of the base plate mounted to a frame member taken along lines 6B-6B of FIG. 6A.
Figure 6C:
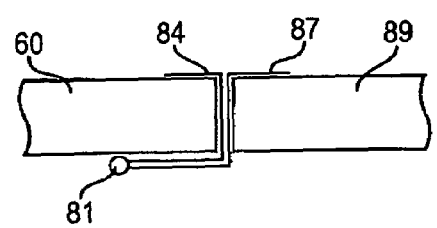
FIG. 6C is a schematic sectional view similar to that of FIG. 6B and showing an alternative embodiment hinge.

With reference to FIG. 6A-6C, the present invention may include a method of mounting a hinge base plate 66 or hinge leaf 84. This method may comprise the steps of selecting a particular jig with a particular length and consistently positioning a hinge base plate 66 or hinge leaf, on a face frame member 60 at a predetermined distance from an adjacent face frame member 62 by removeably securing the jig to the frame member 60 in a position of use. The method may also include retaining the jig in the position of use by a gripping mechanism. The gripping mechanism may comprise a resiliency in a material of a base and gripping members, as shown and described with regard to FIGS. 1-5. Alternatively, a resiliency may be provided by one or more added resilient elements. The method may include abutting the jig against the adjacent frame member 62 and abutting the hinge base 66 or hinge leaf with an edge of the jig. In particular, one end edge or bottom edge 71 of the jig may be abutted against an adjacent adjoining frame member or wall so that an opposite edge or top edge 73 positively establishes a stop for a hinge base plate or hinge leaf. The hinge base plate or leaf may then be abutted with the opposite end edge or top edge 73 of the base of the jig. Thus, a distance 70a from both the top and the bottom of the cabinet to the center of hinge 64 may be established as set forth below. The method may further comprise the steps of fastening the hinge base 64 or hinge, such as by securing a screw to the frame member 60 through the hinge holes 65,68. It is to be understood that the jig of the present invention may be used to position and mount hinge bases that are configured to be mounted on an inner face of the face frame of a cabinet. Furthermore, it is to be understood that a jig of the present invention does by creating a fixed hinge base plate center, define a mounting position for a hinge on the door.

FIG. 6B is a schematic top view of the hinge base plate 66 of FIG. 6A. As shown, a door 75 may be provided with a bored portion 78 for receiving the rest of the overall hinge at a position corresponding to the hinge base center, which is dependent on the length of the jig 10 selected for mounting the hinge base plate 66.

FIG. 6C is a schematic top view similar to FIG. 6B of an alternative hinge configuration that may be mounted according the present invention. An institutional hinge 81 may have a first hinge leaf 84 that generally wraps around an inner edge of a frame 60. The institutional hinge may have a second hinge leaf 87 that similarly wraps around an inner edge of a door 89. As with the other embodiments described herein, the institutional hinge may be positioned and mounted by abutting the hinge 81 or at least one of the leaves against an edge of the jig 10 once the jig 10 has been properly positioned.

The present invention may include a method of mounting a hinge to a frameless cabinet wall. This method may comprise the steps of selecting a particular jig with a particular length and consistently positioning a hinge leaf of a standard hinge on a front edge of the cabinet wall at a predetermined distance from an adjacent wall by removeably securing the jig to the wall in a position of use. The method may also include retaining the jig in the position of use by a gripping mechanism. The gripping mechanism may include a resiliency in a material of a base and gripping members, as shown and described with regard to FIGS. 1-5. Alternatively, a resiliency may be provided by one or more added resilient elements. The method may include abutting the jig against the adjacent frame member and abutting the hinge leaf with an edge of the jig. The method may further include the steps of fastening the hinge leaf, such as by securing a screw to the cabinet wall through the hinge holes. It is further to be understood that hinge bases such as those shown in FIGS. 6A-6C may be mounted on frameless cabinet walls without departing from the spirit and scope of the invention.

The step of removeably securing a jig in accordance with the present invention may comprise moving at least one gripping member from a quiescent state into a gripping state. Selectively placing the jig in a position of use may be accomplished by moving the gripping members from a quiescent state to a position further away from each other and placing the jig so that the at least one gripping member resiliently clamps onto a frame member or wall in a gripping state. Further, the step of removeably securing the jig may include moving each gripping member from a quiescent state to a gripping state in which the gripping members are further away from each other in the gripping state than in the quiescent state. Alternatively, only one of the gripping members may be resiliently supported on a rest of the jig. Further still, the step of removeably securing the jig may comprise moving the jig from a quiescent state to a gripping state by engaging opposite faces of a face frame with gripping members of the jig and thereby urging the gripping members apart. The method may include any one step or any combination of these steps for releasably securing the jig.

In a simple form, the method of mounting a hinge base or hinge leaf may include the steps of placing a jig on a frame member or wall adapted to receive the hinge base or leaf, abutting the hinge base with at least one edge of the jig, and attaching the hinge base or hinge leaf to the frame member or wall while the jig remains in place on the frame member.

FIG. 6A further shows a predetermined length of a jig 10 for placing the center of the hinge 64 a predetermined distance 70 from the bottom of a cabinet. For example, a standard distance 70 from both the top and the bottom of the cabinet to the center of hinge 64 may be three inches. In order to achieve that distance the jig 10 requires a length 72 that is three inches minus half the height of the hinge base 66. However, the desired distance 70 from the top of the cabinet to the center of hinge 64 may vary. Thus, the lengths of the jigs 10 may also be varied as set forth above with regard to jig kits that may have sets of jigs with a variety of lengths. Jigs 10 may be provided in a variety of lengths 72 as set forth above to provide a variety of distances 70 between the bottom of the cabinet and the center of hinge 64, for example.

FIG. 6A further shows a predetermined length of a jig 10 for placing the center of the hinge 64 a predetermined distance 70a from the top of a cabinet. For example, a standard distance 70a from both the top and the bottom of the cabinet to the center of hinge 64 may be three inches. Thus, in order to achieve that distance, the jig 10 requires a length 72 that is three inches minus half the height of the hinge leaf 66, for example.

For purposes of this application, it is to be understood that the term "hinge base plate" has been generally used throughout the specification in reference to the types of hinges in which a separate hinge base is mounted to a cabinet and then a hinge is subsequently attached thereto. Similarly, the term "hinge leaf" refers to leaves of hinges that are integral with the hinge so that another part of the hinge is not attached to the leaf other than by a hinge pin, for example. However, it is to be understood that the term "hinge base" refers to any base of a hinge that is adapted for securing the hinge to one of the structural members that are to be interconnected by the hinge. Therefore, "hinge base" refers to both "hinge base plates" and "hinge leaves".

For purposes of this application, the term "wall" is a general term that encompasses frame members and other cabinet walls, including walls of non-face frame cabinets.

As is known in the art, a great deal of time may be expended in measuring and marking boards or receiving frame members for mounting of hinge base plates or hinges. Furthermore, inaccuracies are often introduced during such measuring and marking. Thus, additional time is often expended in correcting these inaccuracies. Therefore, the cost savings in time and effort provided by the jigs of the present invention, which eliminate these tedious and error prone steps, are substantial. Advantageously, the present invention enables a user to position and mount a hinge base plate or hinge in a single step. Thus, a user no longer needs to mark the positions for drilling mounting holes in the receiving frame member. Rather, the position is already established by the jig. The user may hold the hinge base or hinge in position during drilling and/or mounting of the hinge base or hinge because the user does not need to hold the jig while in use. Then the jig may be removed and the hinge remains in place. A person can quickly mount one hinge after another in this manner without having to stop for intermediate steps including measuring and checking for accuracy. As set forth above, the corresponding doors may be prepared, such as by boring, at precise locations by setting a machine to do so in a mass production operation. Therefore, the person or company that has and uses the jigs of the present invention will therefore have a significant competitive advantage over those who do not.

While the jigs of the present invention have been shown and described with regard to face frame mounted hinges, it is to be understood that the concepts and teachings of the present invention may be applied to other hinge assemblies, hinge base plates, and leaf hinges that may have any of a variety of configurations. The jigs of the present invention may be advantageously formed of any of a variety of machinable and/or injectable plastic materials including but not limited to any of a variety of ABS, styrenes, vinyls (including PVC), polypropylenes, or polyethylenes. The jigs may also be formed of thermoset resins or thermoplastics in high volume molding process(es). It is to be understood that the jigs could also be formed of any of a variety of other materials and in any of a variety of other ways including, but not limited to, metals, woods, or composites, by cutting, stamping, punching, molding, or any combination of such methods.

The jigs in accordance with the present invention may further be size adjustable, such as by a telescoping mechanism that may be secured to provide a particular desired length. Additionally or alternatively, the jigs may be width adjustable by a telescoping mechanism, for example. Thus, a "one size fits all" jig may be provided. Still further, one piece jigs may be provided with score lines for permanently removing a portion of the jigs to achieve one or more predetermined desired length for the jigs. Such permanently adjustable jigs may be formed of a plastic, metal, or composite material.

While the exemplary illustrations show an integral one piece jig, it is contemplated that the jig may be formed of plural pieces. In particular, one or more gripping segments may be adjustably supported on gripping members. In this case, the gripping members may or may not be resiliently supported on a base of the jig. Adjustment of the gripping segments may provide the holding or securing capability of the jig. The gripping segments may be actuated by any one of a number of mechanisms including, but not limited to, threads, cammed eccentric(s), slidable wedges, levers, compliant elements and resilient elements.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed.

The invention claimed is:
1. A jig kit for mounting a hinge, comprising:
   a jig configured to engage and position the hinge, the jig having:
   a base and at least two plate gripping members connected to the base and extending in a first direction away from the base;
   at least one of the base and the gripping members forming a top end edge and a bottom end edge; wherein:

the base and gripping members comprise a holding mechanism, the holding mechanism having being repeatably moveable between a quiescent state and a gripping state;
   the gripping members have respective gripping segments spaced with a minimum separation in the quiescent state in a range from 3/16 to 15/16 of an inch from each other;
the gripping members expandible so that the gripping segments are spaced at least ½ inch from each other in the gripping state; and
wherein one of the top end edge, and the bottom end edge is configured to engage a hinge base.

2. The jig kit of claim 1, wherein the gripping members and base form a reentrant space therebetween in the quiescent state.

3. The jig kit of claim 1, wherein the gripping members and base form a wedge shape opening outward and away from the base in the quiescent state.

4. The jig kit of claim 1, wherein the base and gripping members form a channel.

5. The jig kit of claim 4, wherein the channel has a length in a range from one half inch to eight inches.

6. The jig kit of claim 5, wherein the channel has a length of substantially one and thirteen sixteenths inches.

7. The jig kit of claim 1, further comprising a flared end on at least one of the gripping members, wherein the flared end extends outward and away from the base and the other gripping member.

8. The jig kit of claim 1, further comprising a flared end on each gripping member, wherein the flared ends extend outward and away from the base and the other gripping member.

9. The jig kit of claim 1, further comprising a finger grip element connected to the base and extending in a second direction opposite to the first direction.

10. The jig kit of claim 1 wherein:
the jig is a first jig of a plurality of jigs in the jig kit;
the plurality of jigs comprises jigs of a variety of lengths extending in a direction generally parallel to a channel formed by the base and gripping members.

11. The jig kit of claim 1, wherein:
the jig is a first jig of a plurality, of jigs in the jig kit;
the plurality of jigs comprises jigs having a variety of widths generally defined by a distance between the gripping members.

12. A method of mounting a hinge, comprising:
selecting a jig having a top end edge, a bottom end edge, and a particular jig length;
consistently positioning a hinge base on a wall at a predetermined distance spaced from an adjacent wall by:
removeably securing the jig in a position of use, wherein removably securing further comprises moving at least one gripping member from a quiescent state, that is spaced further from another member than in the quiescent state, the at least one gripping member being biased to the quiescent state;
retaining the jig in the position of use by a gripping mechanism that is integral with jig; and
abutting the hinge base with one of the top end edge and the bottom end edge of the jig during the step of retaining.

13. The method of claim 12 further comprising fastening the hinge base during the step of retaining.

14. The method of claim 12, wherein the at least one gripping member comprises at least two gripping members and the step of removeably securing further comprises moving each of the at least two gripping members from their quiescent state to a gripping state further away from each other than in the quiescent state, the gripping members being biased to the quiescent state.

15. The method of claim 12 wherein the step of removeably securing further comprises moving the jig from a quiescent state to a gripping state by engaging opposite faces of a face frame with gripping members of the jig.

16. A method mounting a hinge base, comprising:
removably placing a jig having first and second end edges on a wall adapted to receive the hinge base, wherein placing further comprises wedging the jig onto the wall;
abutting the hinge base with one of the end edges of the jig; and
attaching the hinge base to the wall while the jig remains in place on the wall.

17. The method of claim 16, wherein:
the wall is a first wall;
the at least one of the end edges is the second end edge and the step of placing further comprises abutting the first end edge of the jig with an adjoining second wall connected to the first wall, and
the first end edge is positioned at a location opposite to the second end edge on the jig.

18. The method of claim 16, wherein the step of placing further comprises enlarging a distance between gripping members of the jig.

* * * * *